United States Patent
Boshev

(10) Patent No.: US 10,528,624 B2
(45) Date of Patent: Jan. 7, 2020

(54) OPTIMAL HASH CALCULATION OF ARCHIVE FILES AND THEIR FILE ENTRIES

(71) Applicant: SAP SE, Walldorf (DE)

(72) Inventor: Stoyan Boshev, Sofia (BG)

(73) Assignee: SAP SE, Walldorf (DE)

( * ) Notice: Subject to any disclaimer, the term of this patent is extended or adjusted under 35 U.S.C. 154(b) by 513 days.

(21) Appl. No.: 14/961,115

(22) Filed: Dec. 7, 2015

(65) Prior Publication Data

US 2017/0161158 A1    Jun. 8, 2017

(51) Int. Cl.
*G06F 16/00* (2019.01)
*G06F 16/901* (2019.01)

(52) U.S. Cl.
CPC ................. *G06F 16/9014* (2019.01)

(58) Field of Classification Search
CPC ........... G06F 11/1458; G06F 17/30949; G06F 2201/80; G06F 16/9014
See application file for complete search history.

(56) References Cited

U.S. PATENT DOCUMENTS

| | | | | |
|---|---|---|---|---|
| 7,162,643 | B1 * | 1/2007 | Sankaran | H04L 63/0428 370/342 |
| 8,387,072 | B1 * | 2/2013 | Czymontek | G06F 9/542 718/106 |
| 9,274,783 | B2 | 3/2016 | Valkov et al. | |
| 2008/0049113 | A1 * | 2/2008 | Hirai | H04L 9/0643 348/222.1 |
| 2010/0117873 | A1 * | 5/2010 | Aciicmez | H03M 7/30 341/51 |
| 2012/0290842 | A1 * | 11/2012 | Artishdad | H04L 63/0428 713/168 |
| 2013/0268497 | A1 * | 10/2013 | Baldwin | G06F 17/30159 707/692 |
| 2014/0082749 | A1 * | 3/2014 | Holland | G06F 21/645 726/29 |
| 2014/0219041 | A1 * | 8/2014 | Kim | G11C 29/00 365/200 |

* cited by examiner

*Primary Examiner* — Tamara T Kyle
*Assistant Examiner* — Lahcen Ennaji
(74) *Attorney, Agent, or Firm* — Fish & Richardson P.C.

(57) ABSTRACT

The present disclosure involves systems, software, and computer implemented methods for calculating hashes of archive files and their file entries. In one example, a method may include receiving an archive file which includes at least one compressed file, storing the archive file by sending a first copy of the archive file stream to a first processing thread which stores the archive file in a local file system, and applying a hash function to the archive file and the at least one compressed file to create hash values corresponding to the archive file and the at least one compressed file by sending a second copy of the archive file stream to a second processing thread, which applies the hash function to the archive file and the at least one compressed file to create the hash values and is executed in parallel to the first processing thread.

17 Claims, 5 Drawing Sheets

|  | 8MB / 571 file entries | 71MB / 355 file entries | 985MB / 61680 file entries |
|---|---|---|---|
| Old algorithm (ms) | 416 ms | 2557 ms | 122643 ms |
| Optimized (ms) | 288 ms | 1777 ms | 72972 ms |
| Optimization % | 30.8 % | 30.5 % | 40.5 % |

OPTIMAL HASH CALCULATION OF ARCHIVE FILES AND THEIR FILE ENTRIES

TECHNICAL FIELD

The present disclosure relates to systems, software, and computer-implemented methods for calculating hashes of archive files and their file entries.

BACKGROUND

When files are transferred, hashes of the files may need to be calculated at the receiver. The calculated hashes can be used, for example, to validate whether the files are transferred without any modification or other error during the transfer. When the transferred files are archive files (e.g., files containing at least one compressed file), hashes of file entries contained within the archive files (e.g., compressed files) may also need to be calculated.

SUMMARY

The present disclosure involves systems, software, and computer-implemented methods for calculating hashes of archive files and their file entries. One example computer-implemented method includes: receiving an archive file which includes at least one compressed file, storing the archive file by sending a first copy of the archive file to a first processing thread which stores the archive file in a local file system, and applying a hash function to the archive file and the at least one compressed file to create hash values corresponding to the archive file and the at least one compressed file by sending a second copy of the archive file to a second processing thread, which applies the hash function to the archive file and the at least one compressed file to create the hash values and is executed in parallel to the first processing thread.

While generally described as computer-implemented software embodied on non-transitory, tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 5 is an example screenshot of a sample test result.

DETAILED DESCRIPTION

Figure 1:
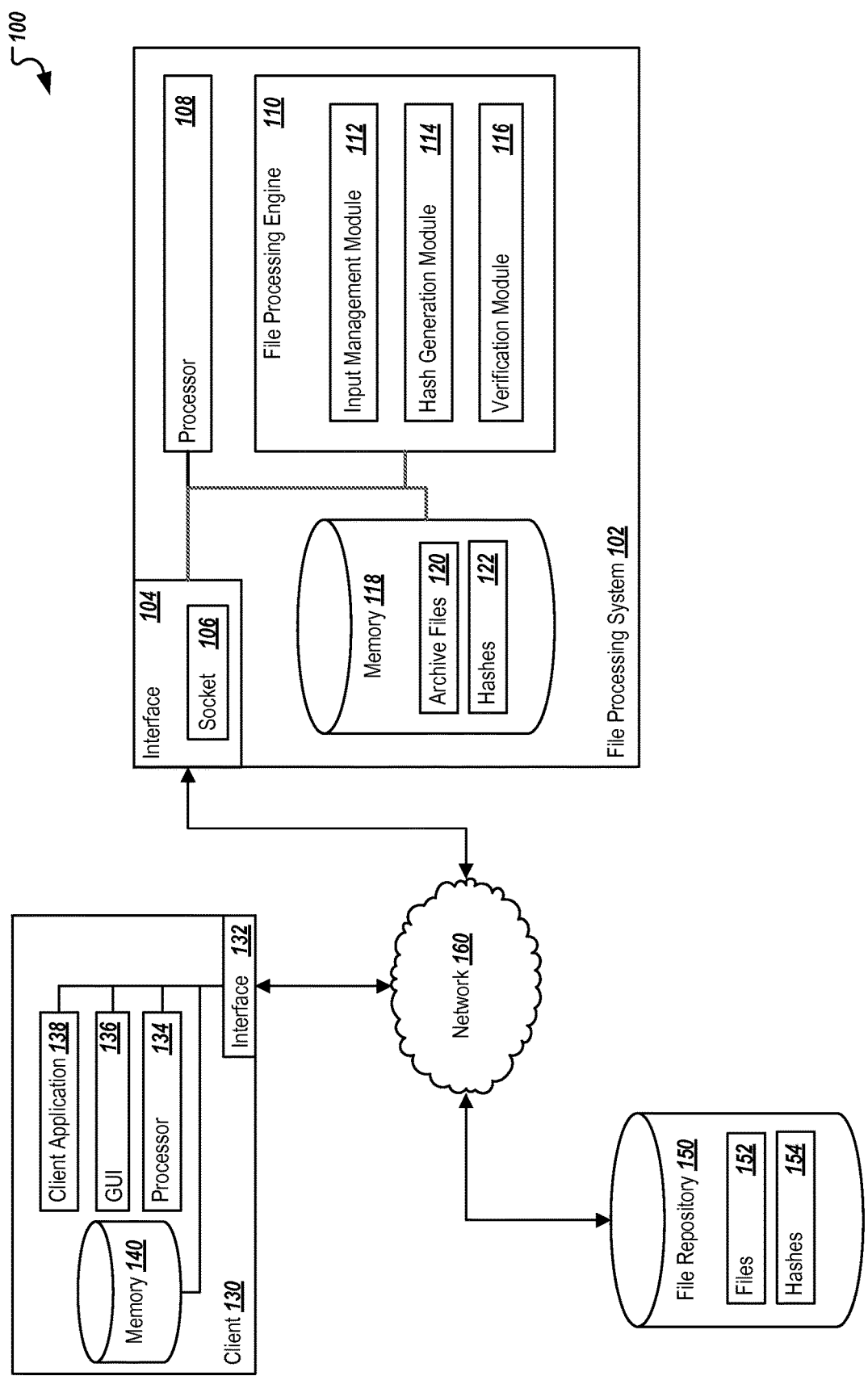
FIG. 1 is a block diagram illustrating an example system for calculating hashes of archive files and their file entries.

The present disclosure describes systems and tools for calculating hashes of archive files and their file entries. A hash (i.e., a hash value) is a number generated by applying a hash function to a string of text or data (e.g., an archive file or a compressed file). The hash is substantially smaller than the string of text itself, and uniquely identifies the string of text. Example hash functions may include SHA-1 and MD5, among others. In some instances, cryptographic hash functions may be used. For a file transferring process between two systems (e.g., a client and a server), hashes can be used to verify whether files are transferred without any modification or other error during the transfer. When the server has a previously stored version of the files and hash values corresponding to those previously stored versions, hashes can be used to identify only the modified files among the files in a transfer, allowing the sending system (e.g., a client) to only send the modified files instead of the whole set of files, or alternatively, to allow the receiving system to identify only the modified files and store those accordingly. To support the above-mentioned file transferring process, the systems needs to calculate hashes of files when the files are transferred or in response to receiving the files and prior to further permanent storage or processing. This disclosure describes the process to optimally calculate hashes of archive files and their file entries during the archive files' transferring process.

The calculation of hashes of transferred files is a CPU intensive process and usually happens after the files are stored locally at the receiving system (e.g., the server). In sequential processing operations, the time spent on hash calculation of the transferred files is added to the total processing time of the files. This increases the time taken for the server to process the files, and as a result, reduces the productivity of the server. The situation gets worse when the files have to be read more than once by the server. This may happen when the files are archive files. The archive files have to be read once for calculating hashes of the archive files. Then the archive files have to be read again, file entry by file entry, in order to calculate hashes of file entries within the archive files. The additional read operation requires additional server resources, such as:

Extra CPU cycles—spent while reading the archive files again from disk; and
  Processing thread time—extra time added to the whole file processing operation for the server thread assigned to process the archive files.

As the size of the archive files increases, the additional server resources required for the additional read operation increases. Optimizing processing time and CPU consumption when calculating hashes of archive files and their file entries can save those CPU cycles and processing time, allowing for a more efficient process.

This disclosure identifies operations for optimally calculating hashes of archive files and their file entries during the archive files' transferring process by calculating hashes of the archive files and their file entries in parallel with storing the archive files locally at the server. Compared to the sequential processing operation described above, this solution performs parallel calculation of the hashes of the archive files and their corresponding file entries in a separate thread from the local storing and processing of the files. In this parallel processing operation, the time spent on hash calculation may not be added to the total processing time of the archive files. Therefore, the total time for processing the archive files is reduced. In addition, since the calculation of the hashes is performed in a separate thread, the additional read operation required in the sequential processing operation is eliminated. As a result, fewer server resources are consumed in the parallel processing operation than in the sequential processing operation, and the productivity of the server in the parallel processing operation may be increased. Any suitable file transferring algorithm that requires hash calculation will benefit from the solution.

Turning to the illustrated embodiment, FIG. 1 is a block diagram illustrating an example system 100 for calculating hashes of archive files and their file entries. Specifically, the illustrated system 100 includes or is communicably coupled with a file processing system 102, a client 130, a file repository 150, and a network 160. Although shown separately, in some implementations, functionality of two or more systems or servers may be provided by a single system or server. In some implementations, the functionality of one illustrated system or server may be provided by multiple systems or servers. Additionally, while illustrated as a client-server system, alternative implementations of the solution may be used to allow for client to client transfers, server-to-server transfers, and client- and/or server-to-cloud or other system transfers, as appropriate.

As used in the present disclosure, the term "computer" is intended to encompass any suitable file processing device. For example, file processing system 102 may be any computer or processing device such as, a blade server, general-purpose personal computer (PC), Mac®, workstation, UNIX-based workstation, or any other suitable device. Moreover, although FIG. 1 illustrates file processing system 102 as a single system, file processing system 102 can be implemented using two or more systems, as well as computers other than servers, including a server pool. In other words, the present disclosure contemplates computers other than general-purpose computers, as well as computers without conventional operating systems. Further, illustrated file processing system 102, client 130, and file repository 150 may each be adapted to execute any operating system, including Linux, UNIX, Windows, Mac OS®, Java™, Android™, or iOS. According to one implementation, the illustrated systems may also include or be communicably coupled with a communication server, an e-mail server, a web server, a caching server, a streaming data server, and/or other suitable servers or computers.

In general, file processing system 102 may be any suitable computing server or system for running applications in response to requests for uploading archive files. The file processing system 102 is described herein in terms of responding to requests for uploading archive files from users at client 130 and other clients, as well as other systems communicably coupled to network 160 or directly connected to the file processing system 102. However, the file processing system 102 may, in some implementations, be a part of a larger system providing additional functionality. For example, file processing system 102 may be part of an enterprise business application or application suite providing one or more of enterprise relationship management, data management systems, customer relationship management, and others. In one example, for testing purposes, file processing system 102 may receive a request to upload archive files, and can calculate hashes of the uploaded archive files and their file entries while storing the uploaded archive files locally. In some implementations, the file processing system 102 may be associated with a particular URL for web-based applications. The particular URL can trigger execution of a plurality of components and systems.

As illustrated, file processing system 102 includes an interface 104, a processor 108, a file processing engine 110, and memory 118. In general, the file processing system 102 is a simplified representation of one or more systems and/or servers that provide the described functionality, and is not meant to be limiting, but rather an example of the systems possible.

The interface 104 is used by the file processing system 102 for communicating with other systems in a distributed environment—including within the system 100—connected to the network 160 (e.g., client 130, file repository 150, and other systems communicably coupled to the network 160). The interface 104 may comprise logic encoded in software and/or hardware in a suitable combination and operable to communicate with the network 160 and the input management module 112. More specifically, the interface 104 may comprise software supporting one or more communication protocols associated with communications, such that the network 160 or the input management module 112 is operable to communicate physical signals with the interface 104 within and outside of the illustrated environment 100. As illustrated, the interface 104 includes socket 106. Socket 106 may be an endpoint for communication between different systems, and may be specifically associated with receiving archive files at the file processing system 102 from one or more other systems. In some instances, the socket 106 may be associated with a specific URL or URI, such that communications are sent directly to the socket 106, while in other instances, certain types of communications (e.g., archive files to be stored or otherwise processed) sent to the file processing system 102 may be routed to the socket 106 to initiate appropriate handling.

Network 160 facilitates wireless or wireline communications between the components of the environment 100 (e.g., between file processing system 102 and client 130, between file processing system 102 and file repository 150, and among others), as well as with any other local or remote computer, such as additional clients, servers, or other devices communicably coupled to network 160, including those not illustrated in FIG. 1. In the illustrated system, the network 160 is depicted as a single network, but may be comprised of more than one network without departing from the scope of this disclosure, so long as at least a portion of the network 160 may facilitate communications between senders and recipients. In some instances, one or more of the illustrated components may be included within network 160 as one or more cloud-based services or operations. For example, the file processing system 102 may be cloud-based services. The network 160 may be all or a portion of an enterprise or secured network, while in another instance, at least a portion of the network 160 may represent a connection to the Internet. In some instances, a portion of the network 160 may be a virtual private network (VPN). Further, all or a portion of the network 160 can comprise either a wireline or wireless link. Example wireless links may include 802.11ac/ad,/af/a/b/g/n, 802.20, WiMax, LTE, and/or any other appropriate wireless link. In other words, the network 160 encompasses any internal or external network, networks, sub-network, or combination thereof operable to facilitate communications between various computing components inside and outside the illustrated system 100. The network 160 may communicate, for example, Internet Protocol (IP) packets, Frame Relay frames, Asynchronous Transfer Mode (ATM) cells, voice, video, data, and other suitable information between network addresses. The network 160 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, the file processing system 102 includes a processor 108. Although illustrated as a single processor 108 in FIG. 1, two or more processors may be used according to particular needs, desires, or particular implementations of the environment 100. Each processor 108 may be a central processing unit (CPU), an application-specific integrated circuit (ASIC), a field-programmable gate array (FPGA), or another suitable component. Generally, the processor 108 executes instructions and manipulates data to perform the operations of the file processing system 102. Specifically, the processor 108 executes the algorithms and operations described in the illustrated figures, including the operations performing the functionality associated with the file processing system 102 generally, as well as the various software modules (e.g., the hash generation module 114), including the functionality for sending communications to and receiving transmissions from client 130.

The file processing system 102 also includes a file processing engine 110. In operation, the file processing engine 110 may read archive files from socket 106, store the archive files in memory 118, calculate hashes of the archive files and their file entries, use the calculated hashes to verify the archive files and their file entries being received correctly, and store the archive files and their file entries along with corresponding hashes in the file repository 150. Operations of the file processing engine 110 are executed by the processor 108. In some implementations, the file processing engine 110 may be a software program, or set of software programs, executing on the file processing system 102. The file processing engine 110 may also be an external component from the file processing system 102 and may communicate with the file processing system 102 over a network.

As shown, the file processing engine 110 includes an input management module 112. In a sequential processing operation, the input management module 112 may read archive files from the socket 106, store the archive files in the memory 118, and after the archive files have been stored, send the archive files to the hash generation module 114 for hash calculation. In a parallel processing operation as described herein, the input management module 112 may read archive files from the socket 106, generate two copies of the read archive files stream, and send one copy of the stream to the memory 118 for storage and send the other copy of the stream to the hash generation module 114 for hash calculation in parallel with the storing.

The file processing engine 110 also includes a hash generation module 114. In operation, the hash generation module 114 may read a file stream sending from the input management module 112 and apply a hash function to the file stream to calculate a hash value for the file stream. For example, the hash generation module 114 receives an archive file stream from the input management module 112 and initially wraps the archive file stream in a DigestInputStream in order to calculate the hash of the whole archive file while the archive file stream is being read. Then the DigestInputStream is wrapped into a ZipInputStream (i.e., the ZipInputStream calls the DigestInputStream to read the stream data) which is used to read individual file entries within the archive file. Next, for each file entry within the archive file, a new DigestInputStream is created to wrap the stream of the particular file entry and to calculate the hash of the particular file entry. While all file entries with the archive file are being read from the ZipInputStream, the hash calculation of the whole archive file is being done in the background. In some implementations, the calculated hash value is sent to the verification module 116 for file verification purpose. Alternative streams, such as a JarInputStream and streams handling other archive file types may also be used.

In the illustrated implementation, the file processing engine 110 also includes a verification module 116. In operation, the verification module 116 may verify the received archive file. The verification process may include at least one of running a virus scan, checking for a zip or decompression bomb attack, and checking for file entries content error during the transfer process. In some cases, the calculated hash is compared with a hash value contained in the received archive file to verify the received archive file. In some cases, the calculated hash is compared with a hash value stored in the hashes 122 to verify the received archive file.

Regardless of the particular implementation, "software" includes computer-readable instructions, firmware, wired and/or programmed hardware, or any combination thereof on a tangible medium (transitory or non-transitory, as appropriate) operable when executed to perform at least one of the processes and operations described herein. In fact, each software component may be fully or partially written or described in any appropriate computer language including C, C++, JavaScript, Java™, Visual Basic, assembler, Perl®, any suitable version of 4GL, as well as others.

As illustrated, file processing system 102 includes memory 118, or multiple memories 118. The memory 118 may include any memory or database module and may take the form of volatile or non-volatile memory including, without limitation, magnetic media, optical media, random access memory (RAM), read-only memory (ROM), removable media, or any other suitable local or remote memory component. The memory 118 may store various objects or data, including financial and/or business data, application information including URLs and settings, user information, behavior and access rules, administrative settings, password information, caches, backup data, repositories storing business and/or dynamic information, and any other appropriate information including any parameters, variables, algorithms, instructions, rules, constraints, or references thereto associated with the purposes of the file processing engine 110 and/or the file processing system 102. Additionally, the memory 118 may store any other appropriate data, such as VPN applications, firmware logs and policies, firewall policies, a security or access log, print or other reporting files, as well as others. For example, illustrated memory 118 includes archive files 120 and hashes 122.

The archive files 120 store the uploaded archive files read by the input management module 112. The hashes 122 store the hashes of the uploaded archive files and their file entries calculated by the hash generation module 114. In some implementations, each hash value stored in the hashes 122, whether it is a hash value of an archive file or a hash value of a file entry within the archive file, can be associated with the specific archive file stored in the archive files 120.

Client 130 may be any computing device operable to connect to or communicate with file processing system 102, other clients (not illustrated), or other components via network 160, as well as with the network 160 itself, using a wireline or wireless connection, and can include a desktop computer, a mobile device, a tablet, a server, or any other suitable computer device. In general, client 130 comprises an electronic computer device operable to receive, transmit, process, and store any appropriate data associated with the system 100 of FIG. 1. In some instances, client 130 can be a particular thing within a group of the internet of things, such as a connected appliance or tool.

As illustrated, client 130 includes an interface 132, a processor 134, an optional graphical user interface (GUI) 136, a client application 138, and memory 140. Interface 132 and processor 134 may be similar to or different than the interface 104 and processor 108 described with regard to file processing system 102. In general, processor 134 executes instructions and manipulates data to perform the operations of the client 130. Specifically, the processor 134 can execute some or all of the algorithms and operations described in the illustrated figures, including the operations performing the functionality associated with the client application 138 and the other components of client 130. Similarly, interface 132 provides the client 130 with the ability to communicate with other systems in a distributed environment—including within the system 100—connected to the network 160.

Client 130 executes a client application 138. The client application 138 may operate with or without requests to the file processing system 102—in other words, the client application 138 may execute its functionality without requiring the file processing system 102 in some instances, such as by accessing data stored locally on the client 130. In others, the client application 138 may be operable to interact with the file processing system 102 by sending requests via network 160 to the file processing system 102 for uploading archive files. In some implementations, the client application 138 may be a standalone web browser, while in others, the client application 138 may be an application with a built-in browser. The client application 138 can be a web-based application or a standalone application developed for the particular client 130. For example, the client application 138 can be a native iOS application for iPad, a desktop application for laptops, as well as others. In another example, the client application 138, where the client 130 is a particular thing (e.g., device) within a group of the internet of things, may be software associated with the functionality of the thing or device. In some instances, the client application 138 may be an application that requests for hashes of previously uploaded archive files and their file entries from the file processing system 102 for delta deployment of content on client 130.

Memory 140 may be similar to or different from memory 118 of the file processing system 102. In general, memory 140 may store various objects or data, including any parameters, variables, algorithms, instructions, rules, constraints, or references thereto associated with the purposes of the client application 138 and/or client 130. Additionally, the memory 140 may store any other appropriate data, such as VPN applications, firmware logs and policies, firewall policies, a security or access log, print or other reporting files, as well as others.

The illustrated client 130 is intended to encompass any computing device such as a desktop computer, laptop/notebook computer, mobile device, smartphone, personal data assistant (PDA), tablet computing device, one or more processors within these devices, or any other suitable processing device. For example, the client 130 may comprise a computer that includes an input device, such as a keypad, touch screen, or other device that can accept user information, and an output device that conveys information associated with the operation of the client application 138 or the client 130 itself, including digital data, visual information, or a GUI 136, as shown with respect to the client 130. Further, while illustrated as a client system, client 130 may be exchanged with another suitable source for file transfers in other implementations, and is not meant to be limiting.

The illustrated file repository 150 is a permanent file storage that is used to store the uploaded archive files and their file entries, as well as the calculated hashes of the uploaded archive files and their file entries. The file repository 150 may be similar to or different from memory 118 of the file processing system 102. As illustrated, the file repository 150 includes files 152 and hashes 154. In some implementations, the files 152 store the uploaded archive files and their file entries. The hashes 154 store the calculated hashes of the uploaded archive files and their file entries stored in the files 152. Each file stored in the files 152, whether it is an archive file or a file entry within an archive file, can be associated with a specific hash value stored in the hashes 154. In some implementations, the file repository 150 may be a separate device connected to the file processing system 102 via network 160, e.g., in a cloud-based system or solution. In some other implementations, the file repository 150 may be a component of the file processing system 102.

While portions of the software elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2A:
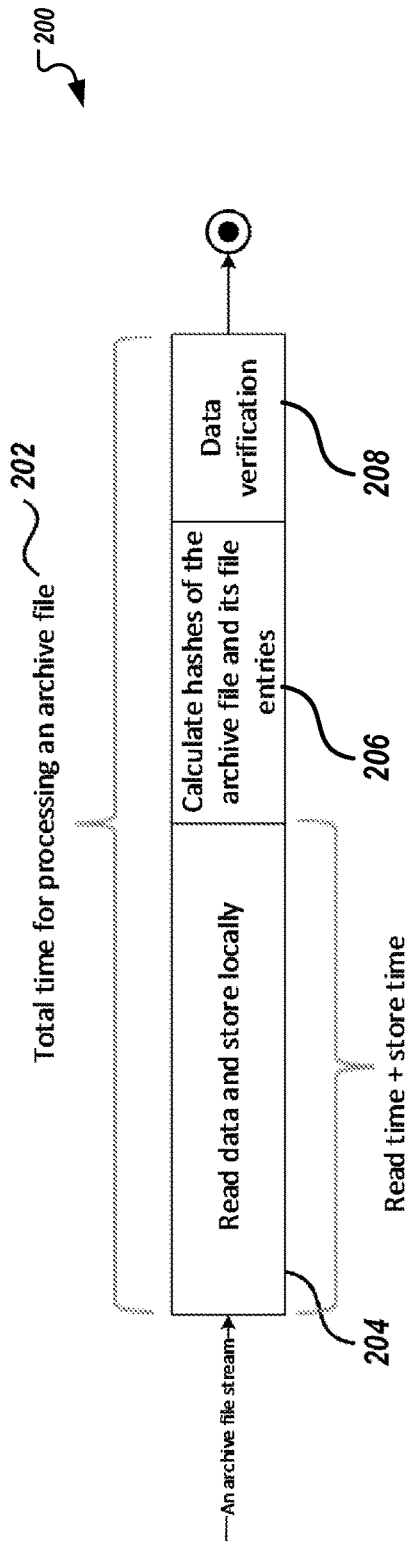
FIG. 2A is a flow diagram of an example sequential operation for processing an archive file.

FIG. 2A is a flow diagram of an example sequential operation 200 for processing an archive file. In some implementations, the sequential operation 200 may include additional and/or different components not shown in the flow diagram. Components may also be omitted from the sequential operation 200, and additional messages may be added to the sequential operation 200. The components illustrated in FIG. 2 may be similar to or different from those described in FIG. 1.

As illustrated in FIG. 2A, total time 202 for processing an archive file includes read and store time 204 of the archive file, time 206 for calculating hashes of the archive file and its file entries, and time 208 for data verification. In this example of sequential operation 200, the calculation of hashes of the archive file and its file entries happens after the archive file is stored locally at a server. Therefore, the time 206 spent on the hash calculation is added to the total processing time of the archive file. This increases the total time 202 taken by the server to process the archive files and as a result, reduces the productivity of the server. In general, the calculation of hashes of the archive file and its file entries is a CPU intensive process. In addition, reading from an archive stream and storing the archive file into a local file system is a slower operation than calculating the hashes. The optimal solution to the described problem is to use a parallel processing on the hash calculation of the archive file, while reading the archive file from the archive file stream.

Figure 2B:
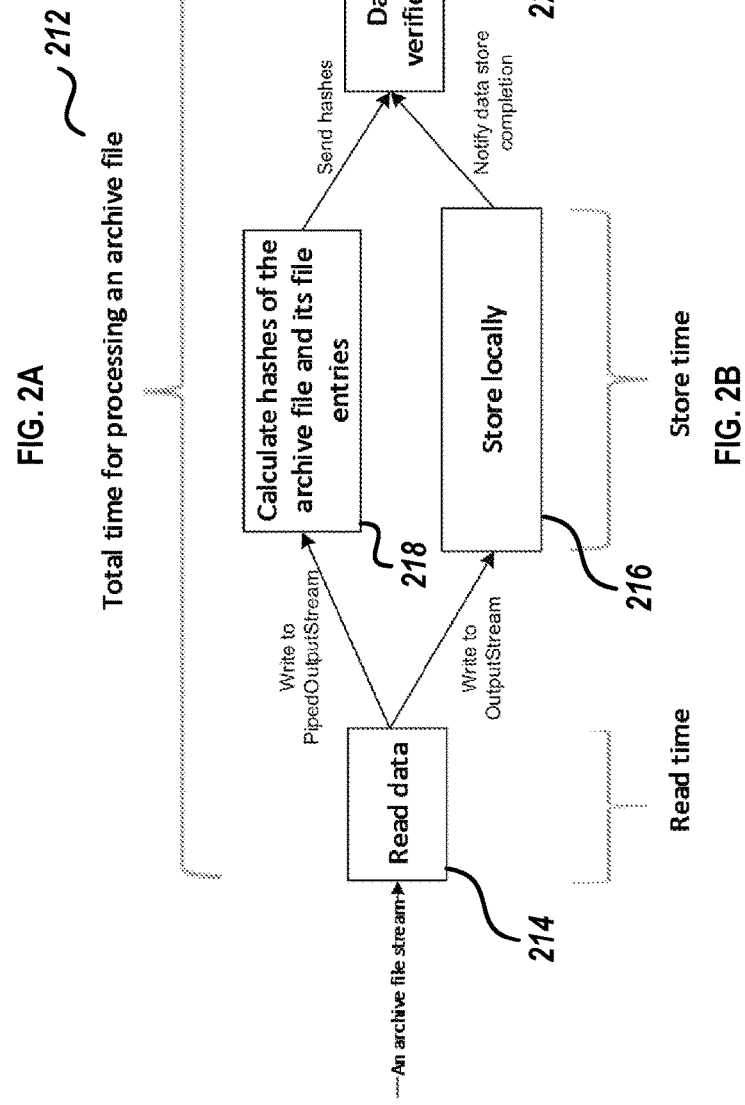
FIG. 2B is a flow diagram of an example parallel operation for processing an archive file.

FIG. 2B is a flow diagram of an example parallel operation 210 for processing an archive file. In some implementations, the operation 210 may include additional and/or different components not shown in the flow diagram. Components may also be omitted from the interaction 210, and additional messages may be added to the operation 210. The components illustrated in FIG. 2B may be similar to or different from those described in FIG. 1.

As illustrated in FIG. 2B, the total time 212 for processing an archive file includes read time 214 of the archive file stream, store time 216 of the archive file, and time 220 for data verification. In this example parallel operation 210, while reading the archive file from the archive file stream, two copies of the read file stream are generated. One copy of the read file stream is sent for local storage (i.e., by writing to OutputStream), while the other copy is sent for hash calculation (i.e., by writing to the PipedOutputStream) in parallel. The calculation of hashes of the archive file and its file entries happens in parallel with the local storage operation. Since storing the archive file into the local file system is a slower operation than calculating the hashes, the time 218 spent on hash calculation is not added to the total processing time 212 of the archive file. Therefore, the total time for processing the archive files is reduced. In addition, since the calculation of the hashes is performed in a separate thread, the additional read operation required in the sequential processing operation is eliminated. As a result, less server resources are consumed in the parallel processing operation than in the sequential processing operation, and the productivity of the server in the parallel processing operation may be increased.

Figure 3:
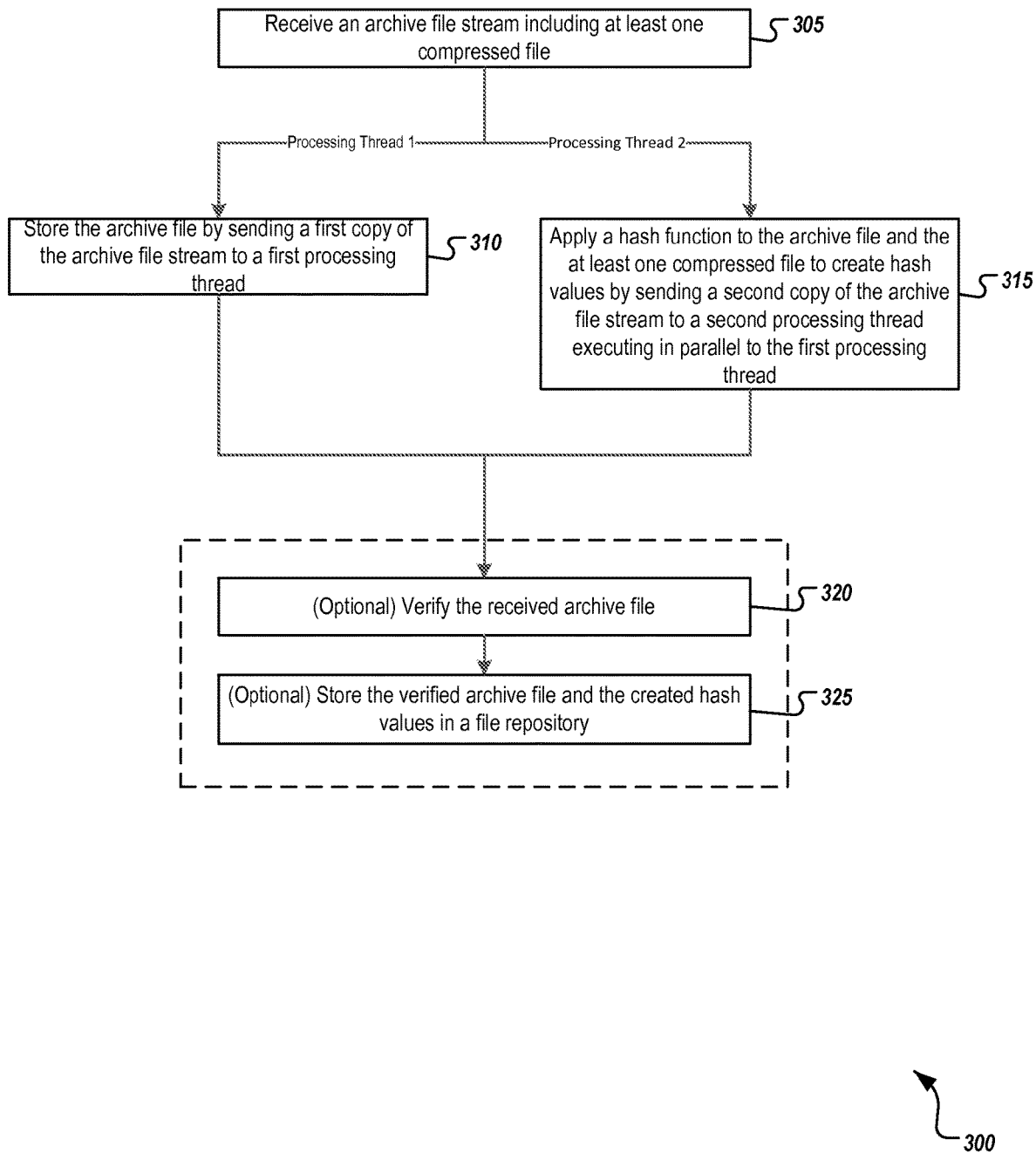
FIG. 3 is a flowchart of an example method for processing archive files and their file entries.

FIG. 3 is a flowchart of an example method 300 for processing archive files and their file entries. It will be understood that method 300 and related methods may be performed, for example, by any suitable system, environment, software, and hardware, or a combination of systems, environments, software, and hardware, as appropriate. For example, one or more of a client, a server, or other suitable computing device can be used to execute method 300 and related methods and obtain any data from the memory of a client, the server, or the other computing device. In some implementations, the method 300 and related methods are executed by one or more components of the system 100 described above with respect to FIG. 1. For example, the method 300 and related methods can be executed by the file processing system 102 of FIG. 1.

At 305, an archive file is received at a server. The archive file includes at least one compressed file. In some cases, the archive file is one of a ZIP, 7-ZIP, JAR, or RAW file, among others. In some implementations, the archive file is sent by a client (e.g., a user, an application, a tool, etc.), server, or other system for uploading the archive file to a file repository and is received at the server (e.g., via an input stream of a socket associated with the server). From 305, two copies of the read archive file stream are generated for two separate processing threads and operation proceeds to 310 and 315 in parallel. As noted, the archive file itself is received as a data stream, with the stream being processed in two parallel threads. Processing streams means that the contents of the stream are read in pieces, or chunks. The two copies of the incoming stream are built piece by piece and are read from the incoming stream.

At 310, the archive file is stored locally on the server by sending a first copy of the archive file stream to a first processing thread. The first processing thread stores the archive file in a local file system of the server.

At 315, a hash function is applied to the archive file stream and the at least one compressed file to create hash values corresponding to the archive file and the at least one compressed file by sending a second copy of the archive file stream to a second processing thread. The second processing thread applies the hash function to the received archive file stream (and therefore, the archive file itself once fully received) and the at least one compressed file to create the hash values. The first processing thread and the second processing thread are executed in parallel. In some instances, the hash function is SHA-1 (Secure Hash Algorithm 1) or MD5 (Message Digest 5).

In some implementations, further operations for processing archive files and their file entries can be optionally performed. For example, both 310 and 315 may proceed to 320. At 320, the received archive file is verified. In some cases, the verification process may include at least one of running a virus scan, checking for a zip or decompression bomb attack, and checking for content errors with the file entries during the transfer process. In some implementations, the client may calculate a hash value of the archive file, and send the calculated hash value along with the archive file (e.g., in metadata of the archive file). The server calculates a hash value of the received archive file, and compares the server calculated hash value with the hash value contained in the received archive file to verify the received archive file. In some other implementations, the server calculated hash is compared with a hash value previously stored in the local file system of the server to verify the received archive file.

At 325, the verified archive file and the created hash values are stored in a file repository. In some cases, the file repository is different than the local file system of the server. In some cases, the file repository is the same as the local file system of the server.

Additional process actions (not shown in FIG. 3) may be added to extend the functionalities of the example method. For example, the created hash of the archive file is compared with hash stored in the local file system or the file repository. If they are the same, it is determined that the received archive file is the same as a previously stored version and no storing operation is needed, such that the received archive file is not permanently stored and the local version is deleted or trashed. If the hash values are not the same, it is determined that the received archive file is an updated version of a previously stored version. Then, hashes of the compressed files are compared to determine a set of compressed files that have been modified. In some instances, only those modified compressed files need to be stored. In another example of delta deployment of content, the client sends to the server only the modified compressed files in an archive file. The delta is calculated based on the hashes of the compressed files contained in the archive file.

Figure 4:
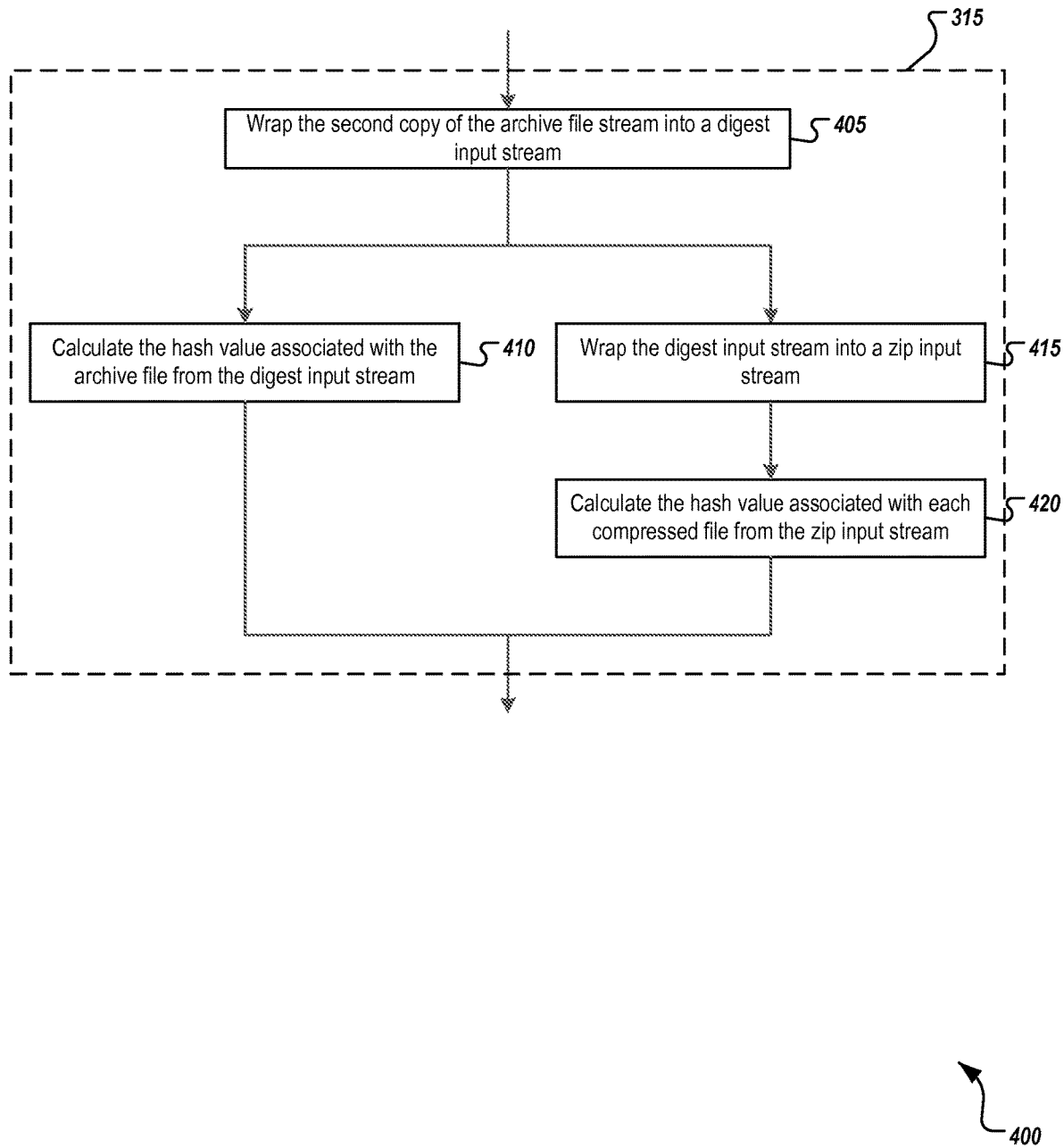
FIG. 4 is a flowchart of an example method for calculating hashes of archive files and their file entries.

FIG. 4 is a flowchart of an example method 400 for calculating hashes of archive files and their file entries. The example method 400 is one example of a detailed operation implemented inside the action 315 as described in FIG. 3. It will be understood that method 400 and related methods may be performed, for example, by any suitable system, environment, software, and hardware, or a combination of systems, environments, software, and hardware, as appropriate. For example, one or more of a client, a server, or other computing device can be used to execute method 300 and related methods and obtain any data from the memory of a client, the server, or the other computing device. In some implementations, the method 400 and related methods are executed by one or more components of the system 100 described above with respect to FIG. 1. For example, the method 400 and related methods can be executed by the hash generation module 114 of FIG. 1.

At 405, the second copy of the archive file stream is wrapped into a digest input stream. The digest input stream is used to read the archive file stream. From 405, method 400 proceeds to 410 and 415 in parallel. Action 410 and action 415 are executed by the same processing thread. Action 410 is being executed automatically, in the background, while action 415 is executed by the thread itself. In some other cases, action 410 and action 415 may be executed by different processing threads.

At 410, the hash value associated with the archive file is calculated from the digest input stream while the digest input stream is being read. At 415, the digest input stream is wrapped into a zip input stream. The zip input stream is used to individually read the at least one compressed file. At 420, for each of the at least one compressed file, the hash value associated with the particular compressed file is calculated. In some implementations, for the calculation of the hash of each file entry, a new digest input stream is created based on the zip input stream. In some instances, for each of the at least one compressed file, calculating the hash value associated with the particular compressed file is performed by using a digest input stream which wraps the stream of the compressed file.

Restated, the described operations are made possible by the introduced hierarchy of streams. In the present example, the archive file stream is wrapped into a digest input stream (for calculation of the archive hash), which is used for initialization of a zip input stream. From the zip input stream are created the input streams of each one of the compressed file entries. A new digest input stream wraps the input stream of each compressed file entry.

The following Java code illustrates hash calculation of an archive file and its files entries. In this solution, the hash calculation of the archive file and its entries is performed by a separate thread. The "Read data" processor reads the data in chunks as byte array. Each read chunk is sent to both the java.io.OutputStream for storing in the local file system and to the javado.PipedOuputStream, which is connected with a java.io.PipedInputStream used by the Hash Calculation Thread (HCT) as the input for the archive file data. In this way, the incoming archive file stream data is split in two streams holding the same data. From the PipedInputStream, the HCT creates java.security.DigestInputStream used for calculation of the hash of the whole archive file. From the DigestInputStream, the HCT creates a java.util.zip.ZipInputStream, which is used for reading the files entries in the archive file. For the calculation of the hash of each file entry, the HCT uses a cycle and for each file, it creates a new DigestInputStream based on the ZipInputStream.

```
/**
 * Reads the source input stream which contains the ZIP
file and writes its data in the target output stream.
 * In the meantime the hash of the ZIP file and its file
entries is calculated.
 * @param is the source input stream of the ZIP file
 * @param os the target output stream
 */
public static void processHashesOptimized(final InputStream
is, OutputStream os) throws IOException,
NoSuchAlgorithmException, InterruptedException {
    final PipedInputStream pis = new PipedInputStream(32 *
1024);
    final PipedOutputStream pos = new PipedOutputStream( );
    pis.connect(pos);
    Thread hashCalculationThread = new Thread( ) {
        public void run( ) {
            try {
                byte[ ] buffer = new byte[8 * 1024];
                int bytesRead = 0;
                String zipHash = null;
                MessageDigest md =
MessageDigest.getInstance("SHA1");
                DigestInputStream dis = new
DigestInputStream(pis, md);
                ZipInputStream zis = new ZipInputStream(dis);
                ZipEntry zipEntry = null;
                while ( (zipEntry = zis.getNextEntry( ) ) !=
null) {
                    if (!zipEntry.isDirectory( ) ) {
                        String zipEntryHash = calculateHash(zis);
                        // process zipEntryHash
                    }
                }
                // read to end the extra bytes left after
reading all file entries in
                // ZipInputStream
                // This is needed to calculate correctly the
                hash of the ZIP file
                while (bytesRead >= 0) {
                    bytesRead = dis.read(buffer);
                }
                zipHash = byteArray2Hex(md.digest( ) );
                // Process zipHash
            } catch (Throwable e) {
                System.out.println("Error occurred: ");
                e.printStackTrace( );
            }
        }
    };
    hashCalculationThread.start( );
    copyStream(is, os, pos);
    hashCalculationThread.join( );
    // input stream is read and stored and hash calculation
    is completed
}
private static String calculateHash(InputStream
inputStream) throws IOException, NoSuchAlgorithmException {
    byte[ ] dataBytes = new byte[8 * 1024];
    int read = 0;
    MessageDigest sha1MessageDigest =
MessageDigest.getInstance("SHA1");
    DigestInputStream dis = new
DigestInputStream(inputStream, sha1MessageDigest);
    while ( (read = dis.read(dataBytes)) != -1) {
    }
    String hash = byteArray2Hex(sha1MessageDigest.digest( )
);
    return hash;
}
public static String byteArray2Hex(byte[ ] hash) {
    Formatter formatter = new Formatter( );
    try {
        for (byte b : hash) {
            formatter.format("%02x", b);
        }
        return formatter.toString( ).toUpperCase( );
    } finally {
        formatter.close( );
    }
}
public static void copyStream(InputStream inputStream,
OutputStream outputStream, PipedOutputStream
pipedOutputStream) throws IOException {
    byte[ ] chunk = new byte[8 * 1024];
    int bytesRead;
    try {
        while ( (bytesRead = inputStream.read(chunk) ) >= 0)
        {
            outputStream.write(chunk, 0, bytesRead);
            pipedOutputStream.write(chunk, 0, bytesRead);
        }
    } finally {
        inputStream.close( );
        pipedOutputStream.close( );
    }
}
```

FIG. 5 illustrates an example screenshot 500 of a sample test result. In this sample test, the efficiency (i.e., optimization 506) of the optimal solution 504 is measured by comparing to a sequential solution 502. The sample test is performed with several ZIP files (e.g., 508, 510, and 512), which have different characteristics in terms of file size and number of entries in these ZIP files. The test is run with Java 8. Each test result represents the average of 10 executions of the test.

In the example screenshot 500, the optimization 506 achieved by the optimal solution 504 over the sequential solution 502 is: 30.8% for an 8 MB Zip file with 571 file entries, 30.5% for an 71 MB Zip file with 355 file entries, and 40.5% for an 985 MB Zip file with 61680 file entries.

The optimal solution 504 performs better than the sequential solution 502 for all three ZIP files. In addition, the optimization 506 increases as the number of file entries increases.

Alternative methods of calculating hashes of archive files and their file entries may be used in other implementations. Those described herein are examples and are not meant to be limiting.

The preceding figures and accompanying descriptions illustrate example systems, processes, and computer-implementable techniques. While the illustrated systems and processes contemplate using, implementing, or executing any suitable technique for performing these and other tasks, it will be understood that these systems and processes are for illustration purposes only and that the described or similar techniques may be performed at any appropriate time, including concurrently, individually, or in combination, or performed by alternative components or systems. In addition, many of the operations in these processes may take place simultaneously, concurrently, and/or in different orders than as shown. Moreover, the illustrated systems may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computerized method performed by one or more processors, the method comprising:
    receiving an archive file via an input stream of a socket, wherein the archive file comprises at least one compressed file;
    reading the archive file from the socket;
    generating two copies of the read archive file stream for two separate processing threads, wherein a first processing thread is associated with storing the archive file, wherein a second processing thread is associated with applying a hash function to the archive file and its compressed files, and wherein the first processing thread and the second processing thread are executed in parallel; and
    in response to generating the two copies of the read archive file stream:
        storing the archive file by sending a first copy of the two copies to the first processing thread, wherein the first processing thread stores the archive file in a local file system; and
        applying a hash function to the archive file and the at least one compressed file to create, in parallel, at least two hash values including a hash value of the archive file and a hash value for each compressed file of the at least one compressed file by sending a second copy of the two copies to the second processing thread, wherein the second processing thread applies the hash function to the archive file to create the hash value of the archive file, and wherein a third processing thread applies the hash function to each compressed file of the at least one compressed file to create the hash value for each compressed file of the at least one compressed file.

2. The method of claim 1, wherein applying the hash function to the archive file and the at least one compressed file comprises:
    wrapping the second copy of the archive file stream into a digest input stream, wherein the digest input stream is used to read the archive file stream and calculate the hash value associated with the archive file;
    wrapping the digest input stream into a zip input stream, wherein the zip input stream is used to individually read the at least one compressed file; and
    for each of the at least one compressed file, calculating the hash value associated with the particular compressed file by using a digest input stream which wraps the stream of the particular compressed file.

3. The method of claim 2, wherein the hash value of the archive file is calculated in a background operation during the calculation of the hash values associated with each of the at least one compressed file.

4. The method of claim 1 further comprising verifying the received archive file, wherein the verification comprises at least one of running a virus scan, checking for a zip or decompression bomb attack, and checking for file entries content error during a transfer process.

5. The method of claim 4 further comprising storing the verified archive file and the created hash values in a file repository, wherein the file repository is different than the local file system.

6. The method of claim 1, wherein the archive file is read only once from the socket.

7. The method of claim 1, wherein the archive file is a ZIP file.

8. The method of claim 1, wherein the hash function is SHA-1 (Secure Hash Algorithm 1) or MD5 (Message Digest 5).

9. The method of claim 1, wherein applying the hash function to the archive file and applying the hash function to the at least one compressed file are executed in parallel by the second processing thread and the third processing thread, respectively.

10. The method of claim 1, wherein the archive file is uploaded by a user.

11. A non-transitory computer storage medium encoded with a computer program, the program comprising instructions that when executed by one or more computers cause the one or more computers to perform operations comprising:
    receiving an archive file via an input stream of a socket, wherein the archive file comprises at least one compressed file;
    reading the archive file from the socket;
    generating two copies of the read archive file stream for two separate processing threads, wherein a first processing thread is associated with storing the archive file, wherein a second processing thread is associated with applying a hash function to the archive file and its compressed files, and wherein the first processing thread and the second processing thread are executed in parallel; and
    in response to generating the two copies of the read archive file stream:
        storing the archive file by sending a first copy of the two copies to the first processing thread, wherein the first processing thread stores the archive file in a local file system; and
        applying a hash function to the archive file and the at least one compressed file to create, in parallel, at least two hash values including a hash value of the archive file and a hash value for each compressed file of the at least one compressed file by sending a second copy of the two copies to the second processing thread, wherein the second processing thread applies the hash function to the archive file to create the hash value of the archive file, and wherein a third processing thread applies the hash function to each compressed file of the at least one compressed file to create the hash value for each compressed file of the at least one compressed file.

12. The medium of claim 11, wherein applying the hash function to the archive file and the at least one compressed file comprises:
   wrapping the second copy of the archive file stream into a digest input stream, wherein the digest input stream is used to read the archive file stream and calculate the hash value associated with the archive file;
   wrapping the digest input stream into a zip input stream, wherein the zip input stream is used to individually read the at least one compressed file; and
   for each of the at least one compressed file, calculating the hash value associated with the particular compressed file by using a digest input stream which wraps the stream of the particular compressed file.

13. The medium of claim 12, wherein the hash value of the archive file is calculated in a background operation during the calculation of the hash values associated with each of the at least one compressed file.

14. The medium of claim 11, wherein the archive file is read only once from the socket.

15. The medium of claim 11, wherein applying the hash function to the archive file and applying the hash function to the at least one compressed file are executed in parallel by the second processing thread and the third processing thread, respectively.

16. A system comprising:
   one or more processors; and
   a computer-readable medium storing instructions executable by the one or more processors to perform operations comprising:
      receiving an archive file via an input stream of a socket, wherein the archive file comprises at least one compressed file;
      reading the archive file from the socket;
      generating two copies of the read archive file stream for two separate processing threads, wherein a first processing thread is associated with storing the archive file, wherein a second processing thread is associated with applying a hash function to the archive file and its compressed files, and wherein the first processing thread and the second processing thread are executed in parallel; and
      in response to generating the two copies of the read archive file stream:
         storing the archive file by sending a first copy of the two copies to the first processing thread, wherein the first processing thread stores the archive file in a local file system; and
         applying a hash function to the archive file and the at least one compressed file to create, in parallel, at least two hash values including a hash value of the archive file and a hash value for each compressed file of the at least one compressed file by sending a second copy of the two copies to the second processing thread, wherein the second processing thread applies the hash function to the archive file to create the hash value of the archive file, and wherein a third processing thread applies the hash function to each compressed file of the at least one compressed file to create the hash value for each compressed file of the at least one compressed file.

17. The system of claim 16, wherein applying the hash function to the archive file and the at least one compressed file comprises:
   wrapping the second copy of the archive file stream into a digest input stream, wherein the digest input stream is used to read the archive file stream and calculate the hash value associated with the archive file;
   wrapping the digest input stream into a zip input stream, wherein the zip input stream is used to individually read the at least one compressed file; and
   for each of the at least one compressed file, calculating the hash value associated with the particular compressed file by using a digest input stream which wraps the stream of the particular compressed file.

* * * * *